(12) United States Patent
Lewis

(10) Patent No.: US 7,853,950 B2
(45) Date of Patent: Dec. 14, 2010

(54) EXECUTING MULTIPLE THREADS IN A PROCESSOR

(75) Inventor: Russell Lee Lewis, Tucson, AZ (US)

(73) Assignee: International Business Machines Corporarion, Armonk, NY (US)

( * ) Notice: Subject to any disclaimer, the term of this patent is extended or adjusted under 35 U.S.C. 154(b) by 348 days.

(21) Appl. No.: 11/697,240

(22) Filed: Apr. 5, 2007

(65) Prior Publication Data

US 2008/0250422 A1    Oct. 9, 2008

(51) Int. Cl.
    *G06F 9/46* (2006.01)
(52) U.S. Cl. .................. 718/102; 718/100; 718/104; 718/108
(58) Field of Classification Search .......... 718/1, 718/100, 101, 102, 103, 104, 105, 106, 107, 718/108
See application file for complete search history.

(56) References Cited

U.S. PATENT DOCUMENTS

| | | | | |
|---|---|---|---|---|
| 5,396,616 | A * | 3/1995 | Venable .................. | 703/27 |
| 6,615,217 | B2 * | 9/2003 | Rosensteel et al. .................. | 1/1 |
| 7,174,554 | B2 * | 2/2007 | Pierce et al. ................. | 718/107 |
| 7,207,042 | B2 * | 4/2007 | Smith et al. .................. | 718/104 |
| 7,366,878 | B1 * | 4/2008 | Mills et al. .................. | 712/214 |
| 7,426,731 | B2 * | 9/2008 | Findeisen ................... | 718/104 |
| 7,472,389 | B2 * | 12/2008 | Smith et al. ................. | 718/102 |
| 7,647,483 | B2 * | 1/2010 | Bates et al. ................. | 712/220 |
| 2003/0158885 | A1 * | 8/2003 | Sager ......................... | 709/108 |
| 2003/0225816 | A1 | 12/2003 | Morrow et al. | |
| 2004/0187120 | A1 * | 9/2004 | Moore et al. ................ | 718/100 |
| 2005/0076335 | A1 | 4/2005 | Cavage et al. | |
| 2005/0096970 | A1 * | 5/2005 | Weber ......................... | 705/11 |
| 2005/0141424 | A1 * | 6/2005 | Lim et al. .................... | 370/235 |
| 2005/0188373 | A1 * | 8/2005 | Inoue et al. ................. | 718/100 |
| 2005/0210471 | A1 | 9/2005 | Okawara | |
| 2005/0235285 | A1 * | 10/2005 | Monasterio ................. | 718/100 |
| 2006/0037025 | A1 * | 2/2006 | Janssen et al. .............. | 718/107 |
| 2006/0150184 | A1 | 7/2006 | Hankins et al. | |
| 2006/0179284 | A1 | 8/2006 | Jensen et al. | |
| 2006/0190945 | A1 * | 8/2006 | Kissell ........................ | 718/108 |
| 2006/0195683 | A1 | 8/2006 | Kissell | |
| 2006/0277126 | A1 * | 12/2006 | Rosenbluth et al. .......... | 705/35 |
| 2008/0104600 | A1 * | 5/2008 | May ........................... | 718/103 |
| 2008/0134185 | A1 * | 6/2008 | Fedorova .................... | 718/102 |
| 2008/0163230 | A1 * | 7/2008 | Latorre et al. ............... | 718/104 |

(Continued)

OTHER PUBLICATIONS

N. Vouk; Buddy Threading in Distributed Applications on Simultaneous Multi-Threading Processors; Master's Thesis; Computer Science Department; Raleigh, North Carolina 2005.*

(Continued)

*Primary Examiner*—Li B Zhen
*Assistant Examiner*—Abdullah Al Kawsar
(74) *Attorney, Agent, or Firm*—David W. Victor; Konrad Raynes & Victor LLP

(57) ABSTRACT

Provided are a method, system, and program for executing multiple threads in a processor. Credits are set for a plurality of threads executed by the processor. The processor alternates among executing the threads having available credit. The processor decrements the credit for one of the threads in response to executing the thread and initiates an operation to reassign credits to the threads in response to depleting all the thread credits.

14 Claims, 5 Drawing Sheets

U.S. PATENT DOCUMENTS

2008/0168447 A1*  7/2008  Lewis ......................... 718/102
2009/0083508 A1*  3/2009  Otero Perez et al. ........ 711/170

OTHER PUBLICATIONS

McKusick et al., "The Design and Implementation of the 4.4 BSD Operating System" ISBN 0201549794, date: Apr. 30, 1996; pp. 12.*

David B. Stewart and Pradeep K. Khosla; Mechanirms for Detecting and Handling Timing Errors; Communications of the ACM Jan. 1997/vol. 40, No. 1; pp. 87-93.*

Z. Deng; An Open Environment for Real-Time Applications; The International Journal of Time-Critical Computing Systems, 16, 155-185 (1999).*

McKusick et al., "The Design . . . 4.4 BSD Operating System" ISBN 0201549794, Apr. 30, 1996.

M.N. Yankelevsky, et al., "a-Coral: A Multigrain, Multithreading Processor Architecture", Proceedings of the 15th Int'l Conf. on Supercomputing, ACM 2001, pp. 358-367.

J. Nakajima, "Enhancements for Hyper-Threading Technology in the Operating Systems—Seeking the Optimal Scheduling", USENIX Association, Proceedings of 2nd Workshop on Industrial Experiences with Systems Software, Dec. 2002, pp. 1-15.

* cited by examiner

EXECUTING MULTIPLE THREADS IN A PROCESSOR

BACKGROUND OF THE INVENTION

1. Field of the Invention

The present invention relates to a method, system, and article of manufacture for executing multiple threads in a processor.

2. Description of the Related Art

An operating system scheduler may assign specific timeslices on a processor to various threads. The operating system scheduler, on a regular basis, saves the state of a thread and replaces it with another for the processor to execute. Additionally, the operating system may assign threads to execute on logical processors executed by a physical processor. A logical processor is a logical construct or entity representing processor resources that run threads. A processor alternates between executing different logical processors and their threads. In further systems, some processors may implement only a single logical processor.

An operating system scheduler may implement preemptive scheduling, where a timer interrupt is used to limit the time each thread executes. When the timer expires, such as after a few milliseconds or a number of instructions, an interrupt is generated to invoke the operating system scheduler to determine whether to interrupt the currently executing thread or allow the thread to continue executing. The processor maintains a register file including information on the thread being executed. After executing one thread for a time period, the processor calls the operating system scheduler to perform a context switch to execute a next thread. During the context switch, the operating system scheduler writes the register file of the next thread to execute to the processor and then invokes the processor to switch to executing this next thread.

This technique has the disadvantage of interrupting a thread that is entitled to continue executing for an extended period.

A non-preemptive scheduler allows threads to execute uninterrupted until completion. This technique has the disadvantage of allowing a lower priority thread or thread that is not executing properly to prevent or delay other higher priority threads from executing.

A symmetric multithreading (SMT) processor has multiple logical processors in the same central processing unit (CPU). In SMT systems, a timeslice for a thread to process a program within the hardware may extend for a few nanoseconds and a timeslice initiated by the operating system may extend for several milliseconds. Registers in the CPU include information identifying each thread and its status, e.g., executing, not executing, etc. Timers or decrementers force each thread into the operating system scheduler every few milliseconds. However, between these interrupts to the operating system scheduler, each thread may be executed on millions of shorter, hardware-managed timeslices. In prior art SMT systems, there is timeslicing at a nano level (managed by the hardware, and not involving the operating system) and another type of timeslicing at the macro level (managed explicitly by the operating system).

There is a need in the art for improved techniques for configuring a processor to execute multiple threads.

SUMMARY

Provided are a method, system, and program for executing multiple threads in a processor. Credits are set for a plurality of threads executed by the processor. The processor alternates among executing the threads having available credit. The processor decrements the credit for one of the threads in response to executing the thread and initiates an operation to reassign credits to the threads in response to depleting all the thread credits.

DETAILED DESCRIPTION

Figure 1:
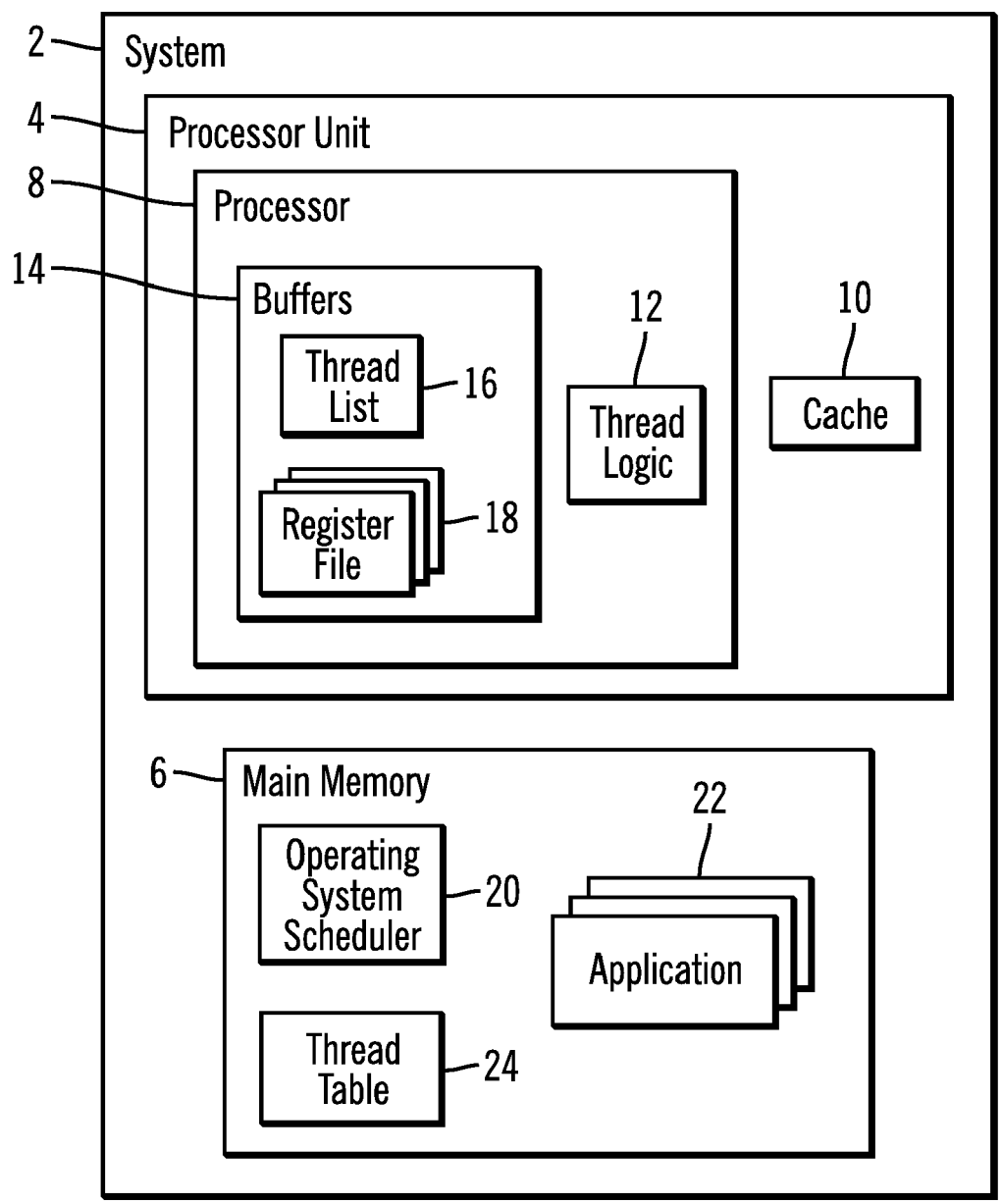
FIG. 1 illustrates an embodiment of a computing environment.

FIG. 1 illustrates an embodiment of a computing environment. A system 2 includes a processor unit 4, such as a central processor unit (CPU), processor complex, etc., and a main memory 6 accessible to the processor unit 4. The processor unit 4 includes one or more processors 8, one is shown, and a processor cache 10, such as an on-board cache, e.g., the L1 and L2 caches. The processor 8 comprises the processor circuitry, including thread logic 12, for processing threads and processor buffers 14 to store data used by the thread logic 12. The processor buffers 14 include register files 18, where there is one register file 18 for each thread the processor 8 is executing, and a thread list 16 of threads to execute.

The main memory 6 includes an operating system scheduler 20 comprising operating system code executed by the processor unit 4, one or more application programs 22 comprising the application code executed by processor threads, and a thread table 24 having information on threads to execute, including thread priority, assignment of threads to the processors 8, etc.

In FIG. 1, the processor unit 4 is shown as having one processor 8. In additional embodiments, the processor unit 4 may include multiple processors 8, or processor cores. In such case, the operating system scheduler 20 assigns threads to different of the processor cores.

In certain embodiments, processor resources may be represented by logical processors executed by the processor 8, such that the operating system scheduler 20 assigns threads to logical processors and each register file is assigned to one logical processor. The processor 8 alternates executing threads assigned to the different logical processors.

Figure 2:
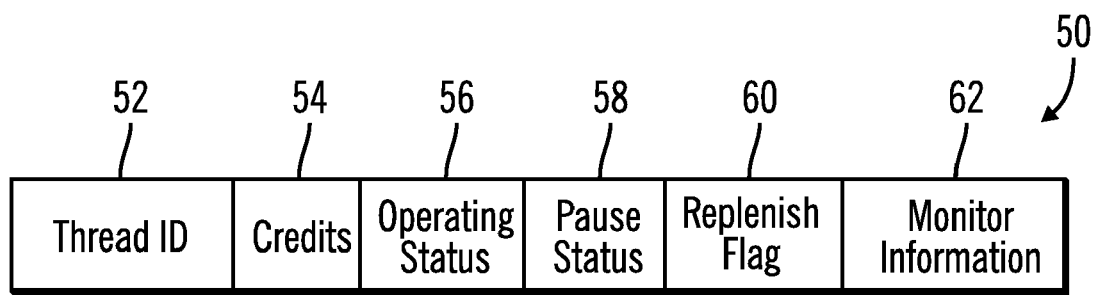
FIG. 2 illustrates an embodiment of information in a register file for one thread maintained by the processor.

FIG. 2 illustrates an embodiment of an instance of information included in one register file 50 for a thread, such as register file 18. The information in the register files 50 may be implemented in buffers 14 in the processor 8 circuitry. The register file 50 for a thread may include: a thread identifier (ID) 52 of the thread or logical processor for which the register file is maintained; credits 54 indicating a number of credits assigned to the thread 52 by the operating system scheduler 24; operating status 56 of the thread, such as active, paused, last instruction executed, last returned value, etc.; pause status 58 indicating whether the thread 52 has executed a pause instruction to wait for an event to occur, such as a lock to be released; a replenish flag 60 that is set to indicate that the thread is to only execute if all other threads are unrunnable, meaning they are blocked or have depleted all their credits or otherwise unable to run, which occurs for the replenish thread; and monitor information 62 indicating whether an event is being monitored for the thread. A "runnable" thread comprises a thread that may be executed, e.g., has available credits, is not blocked or otherwise may be executed. The monitor information 62 may include information identifying the monitored event, such as a memory location being monitored for a change, so that when the event is detected, the processor 8 can associate the detected event with the thread for which the monitoring was initiated.

In certain embodiments, some threads may be configured for "infinite credits," meaning that they never run out of credits 54, and that at least one logical processor may be configured that way when the processor first starts running (so that the operating system has time to load and make credit decisions without depleting credits).

In certain embodiments, the thread logic executes the replenish flag 60 if all other threads are unrunnable, which may occur if the credits 54 for all other threads are zero and/or the threads are blocked. A replenish thread having the replenish flag 60 set may run even if the replenish thread has zero credits 54. Further, the thread logic 12 will stop executing the replenish thread, i.e., the thread having the replenish flag 60 set, when another thread becomes runnable through being assigned more credits or otherwise being placed in a runnable status. Further, in certain embodiments, the replenish flag 60 may only be cleared by the operating system scheduler 20, not the hardware.

Figure 3:
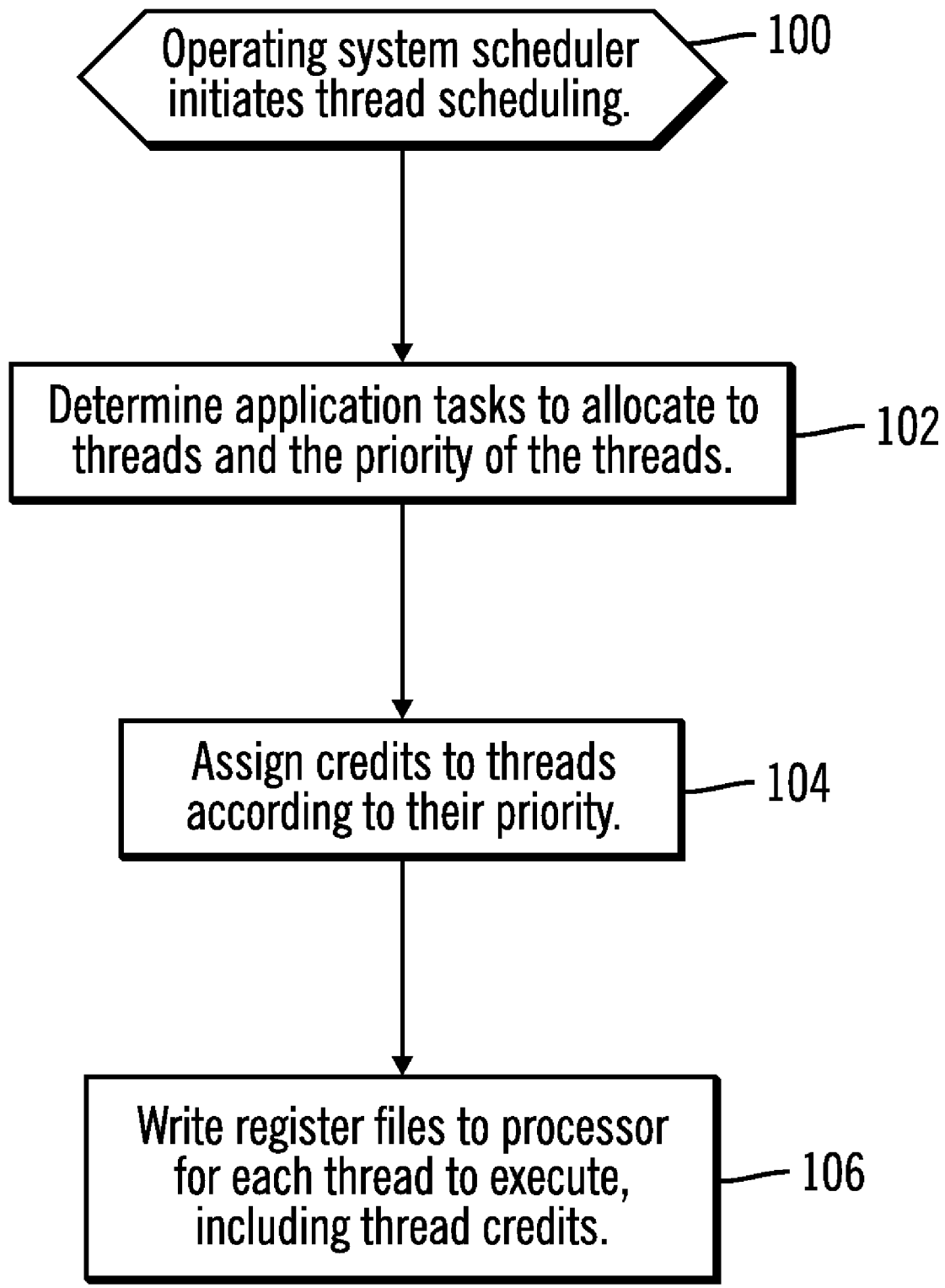
FIG. 3 illustrates an embodiment of operations performed by an operating system scheduler to configure the processor to execute threads.

FIG. 3 illustrates an embodiment of operations performed by the operating system scheduler 20 to configure the processor 8 with information on threads to execute. Upon initiating (at block 100) thread scheduling, the operating system scheduler 20 determines (at block 102) application 22 tasks to allocate to threads and the priority for the threads. The operating system scheduler 20 further assigns (at block 104) credits to threads according to the thread priorities, where higher priority threads may be assigned a relatively greater number of credits to schedule them to have more execution time on the processor 8. The operating system scheduler 20 further writes (at block 106) register files 18, 50 to the processor buffer 14 for each thread to execute, including thread credits 54 (FIG. 2). This writing configures the processor 8 to execute the threads. As discussed, the operating system scheduler 20 may assign threads to execute to logical processors, and then write the register files to buffers for logical processors representing processor resources to execute the threads.

Figure 4:
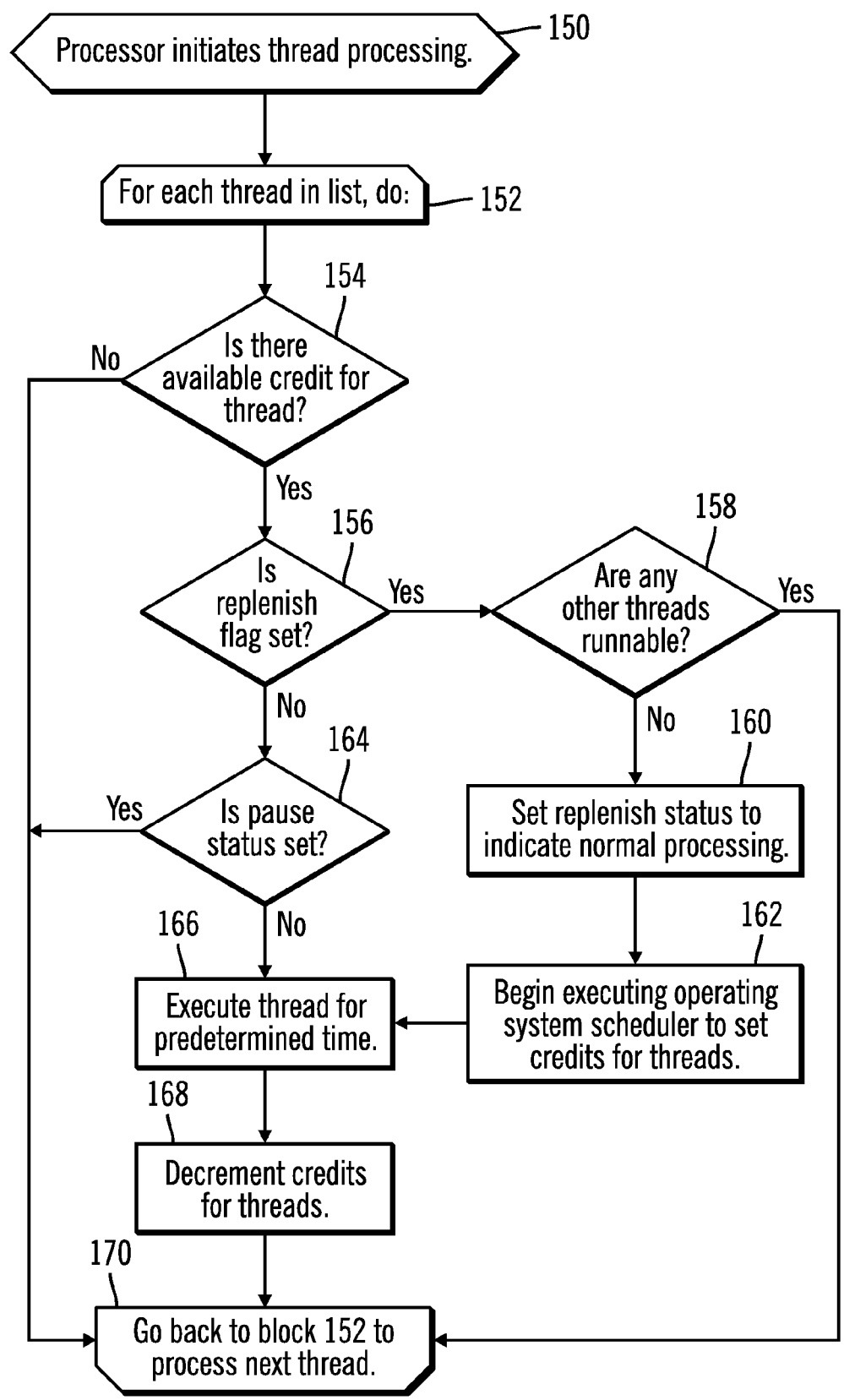
FIG. 4 illustrates an embodiment of operations performed by a processor to execute threads.

In one embodiment, the operating system scheduler 20 configures register files 18 for multiple threads to execute application 22 tasks and configures one register file 18 for a replenish thread that is assigned credits 54, but has the replenish flag 60 set to indicate that the replenish thread only executes when all other threads executing application 22 or other operating system tasks have completed FIG. 4 illustrates an embodiment of operations performed by the thread logic 12 in the processor 8, which may be implemented in processor circuitry or as microcode executed by the processor 8 circuitry. Upon initiating (at block 150) thread (or logical processor) processing, the thread logic 12 performs the operations at blocks 152 through 170 for each thread indicated in the thread list 16. If (at block 154) there is no available credit 54 (FIG. 2) for the thread being considered in the list 16, then control proceeds to block 170 to consider a next thread in the list 16. If all threads in the list 16 have been considered, then the thread logic 12 continues to process the list 16. The threads in the thread list 16 may be processed in the order in which they are listed, a random order, a priority based order, etc. If (at block 154) there are available credits for the thread being considered and if (at block 156) the replenish flag 60 is set, indicating that the thread is the replenish thread to only be processed if no other thread is runnable, i.e., all other threads have no available credit (which is set only for the replenish thread) or otherwise blocked, then the thread logic 12 determines (at block 158) whether any other thread is runnable, e.g., has available credit 54 and is not otherwise blocked. If at least one thread is runnable, then control proceeds to block 170 to consider a next thread because the replenish thread will not be invoked. If (at block 158) all other threads are not runnable, then the replenish flag 60 is set (at block 160) to "off", so that the thread logic 12 will continue to process the replenish thread even if other task threads are reassigned credits to allow the replenish thread to complete resetting the credits 54 for all the threads before being prevented from executing by the replenish flag 60. The thread logic 12 then begins executing (at block 162) the operating system scheduler 20 to reset the credits 54 for all the threads, regardless of the remaining credits 54 for the threads.

In one embodiment, the replenish thread may be implemented by first setting "infinite credits", and then performing a loop of operations comprising: setting the replenish flag 60 "off"; calling the operating system scheduler 20 to calculate the credits to assign to all threads; assigning the calculated credits to the other threads; and then setting the replenish flag 60 "on", which causes the replenish thread to stop executing once another thread becomes runnable.

If (at block 156) the replenish flag 60 is not set, then the thread logic 12 determines (at block 164) whether the pause status 58 is set. As discussed, the pause status is set if the thread logic 12 executes a pause instruction on the thread. If (at block 164) the pause status 58 is set, then control proceeds to block 170 to consider the next thread. Otherwise, if (at block 164) the pause status is not set, then the thread logic 12 executes (at block 166) the thread for a predetermined time. The predetermined time may comprise a number of clock cycles, a number of instructions, a number of memory accesses, or any other measurement that may be used to determine how long a thread may be executed. In one embodiment, the thread logic 12 executes each thread for the same predetermined time. In an alternative embodiment, the thread logic 12 may execute different types or specific threads for different predetermined times, such that higher priority threads are executed for a relatively longer time than lower priority threads. The predetermined time may be cut short in some circumstances, such as in cases where the thread is blocked for many cycles as a result of a condition. For instance, if there is a cache miss, the thread's execution time may be cut short to allow some other thread to run.

The thread executed at block 166 may comprise a task thread or replenish thread whose replenish flag 60 was set "off" (from the no branch of block 164) or the replenish thread whose replenish flag 60 was just turned "off" (from block 162). Upon completing execution of the thread for the predetermined time, the credits 54 for that thread are decremented (at block 168) and control proceeds to block 170 to continue processing threads in the thread list 16 until all thread processing has completed or the operating system scheduler 20 has reconfigured the processor buffers 14. The credits 54 may be decremented by a fixed value, or by some calculated value chosen to represent the amount of processor resources consumed. In some embodiments, the units measured may be the number of instructions executed, clock cycles, memory references, power consumption, or any combination of these measurements With the described embodiments of FIG. 4, switching between threads is handled within the processor 8 to alternate execution among threads having available credits. When all credits run out, then the processor 8 executes a replenish thread to call the operating system scheduler 20 to reset all the thread credits 54 to enable continued execution of the threads. This allows the processor 8 to alternate executing among the threads without having to return to the operating system scheduler 20, thus avoiding the need for a context switch or the operating system scheduler 20 operation to write to the processor buffers 14 or registers to switch execution to a different thread. Moreover, in certain embodiments, the processor 8 can cause switching execution among the threads faster because the processor 8 is utilizing buffers 14 in the processor circuitry to maintain the information, such as the credits 54, needed to determine when to switch to executing a different thread, and how long to execute each thread relative to other threads.

Figure 5:
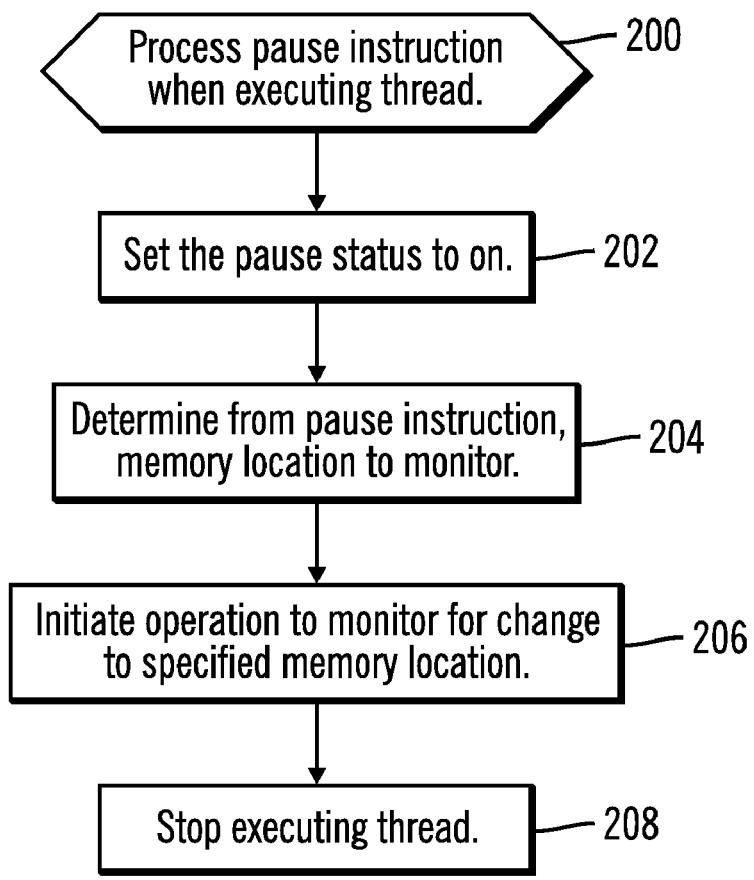
FIG. 5 illustrates an embodiment of operations performed by the processor to execute a pause instruction on a thread.

FIG. 5 illustrates an embodiment of operations the thread logic 12 performs in response to executing a pause instruction (at block 200). In response to executing the pause instruction, the thread logic 12 sets (at block 202) the pause status 58 to "on", to indicate that the thread is to be paused. The thread logic 12 may then determine (at block 204) from the pause instruction a memory location in the memory 6 to monitor for changes. For instance, if the thread needs to access a lock for a resource, such as a mutex, then the memory location may comprise the location of the lock in the memory 6. In such case, the processor 8 monitors for a change to the memory location having the lock, which may indicate that the lock has been released. In alternative embodiments, the pause instruction may specify another event to monitor. The thread logic 12 may then initiate (at block 206) an operation to monitor for a change to the specified memory location and thread execution ends (at block 208). The thread logic 12 may update the monitor information 62 (FIG. 2) to indicate that monitoring is occurring of a specified memory location or for a specified event.

Figure 6:
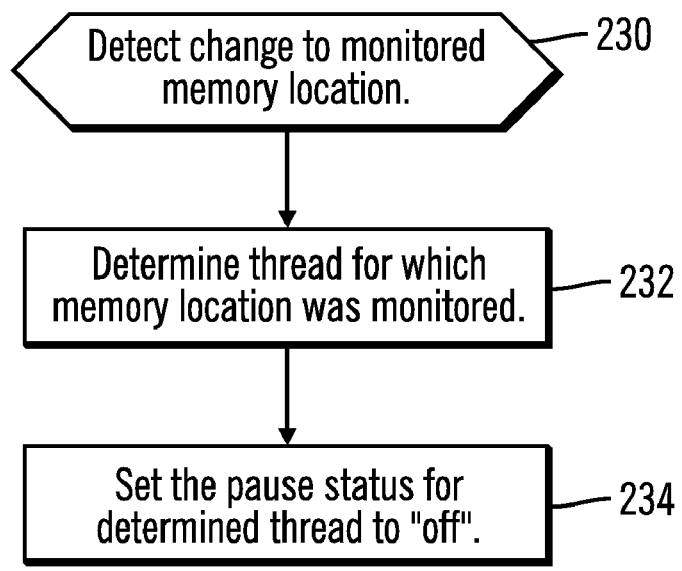
FIG. 6 illustrates an embodiment of operations performed by the processor to monitor for a change to a memory location for a pause instruction.

FIG. 6 illustrates an embodiment of operations performed by the thread logic 12 or other processor logic 8 in response to detecting (at block 230) a change to the memory location being monitored. In response, the processor 8 determines (at block 232) the thread for which the memory location was being monitored, which may comprise determining the thread 52 whose monitor information 62 (FIG. 2) identifies the memory location (or other event) being monitored where the access or event was detected. The pause status 58 for the determined thread is set to "off", to indicate that processing of the thread may continue the next time the thread logic 12 processes the thread in the thread list 16, if the thread has available credits 54.

The described embodiments of FIGS. 5 and 6 provide a technique to allow the processor 8 circuitry to pause a thread and wait until a resource becomes available to continue executing the thread without having to return to the operating system scheduler 20 to handle the pause or monitoring for the event. Instead, with the described embodiments, the pausing of the thread and monitoring is handled in the processor circuitry 8, without calling the operating system scheduler 20 and without requiring the operating system scheduler 20 to perform context switching to alternate the threads being executed in the processor 8.

Figure 7:
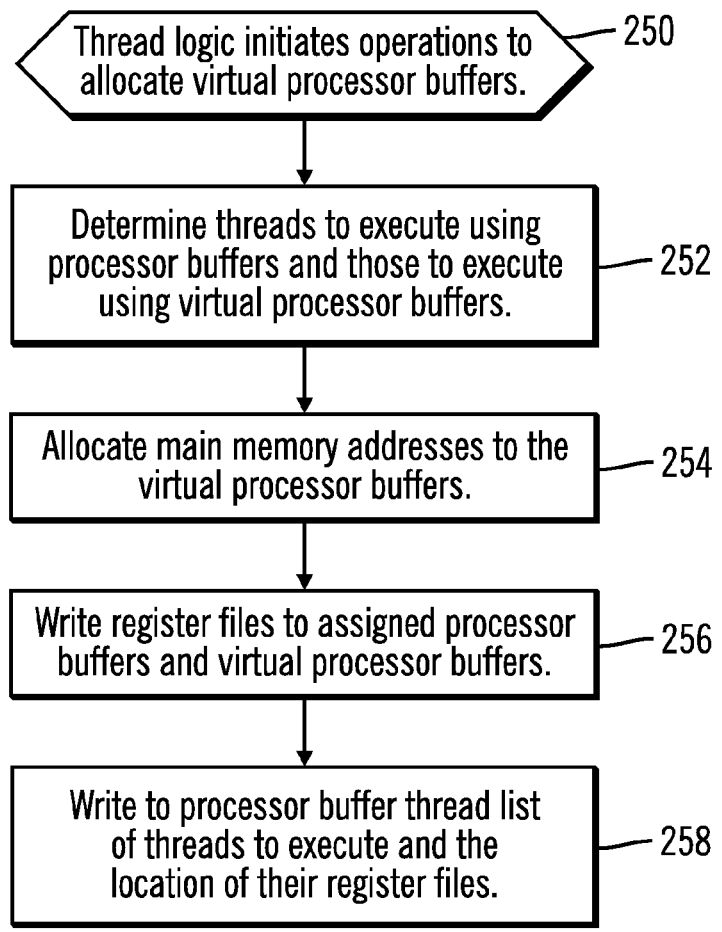
FIG. 7 illustrates an embodiment of operations performed by the operating system scheduler to allocate virtual processor buffers for the processor to use.

FIG. 7 illustrates an embodiment of operations performed by the thread logic 12 to assign virtual processing buffers in the main memory 6 to store register files 18 for threads executed by the processor 8. Upon initiating operations (at block 250) to allocate virtual processor buffers, the thread logic 12 determines (at block 252) threads to execute using processor buffers 14 and those to execute using virtual processor buffers allocated in the main memory 6. In one embodiment, the thread logic 12 may allocate higher priority tasks to threads whose register file 18 is maintained in the faster access processor buffer 14 and lower priority tasks to virtual processor buffers in the main memory 6. Additionally, the thread logic 12 may allocate tasks more likely to be executed immediately, e.g., in the next few milliseconds, to threads whose register files are maintained in the processor buffer 14 over threads less likely to be executed in the next few milliseconds. The thread logic 12 allocates (at block 254) main memory 6 addresses to the virtual processor buffers and writes (at block 256) register files 16 to assigned processor buffers 14 and virtual processor buffers. The thread logic 12 then writes (at block 258) into the processor buffer 14 the thread list 126 of threads to execute and the location of their register files 16 in the processor buffers 14 or virtual processor buffers in the main memory 6. The virtual processor buffers in the main memory 6 take longer for the processor 8 to access than the processor buffers 14 because the processor 8 must initiate memory access operations over a system memory bus.

In certain embodiments, the operating system scheduler 20 may maintain control over whether or not the thread logic 12 makes use of virtual processor buffers, the size of the virtual buffers, and where they reside in the main memory 6. For instance, in alternative embodiments, the operating system scheduler may perform the operations of FIG. 7. The processor buffers 14 may include locations where the operating system scheduler 20 may write to instruct the thread logic 12 on the locations to use as the virtual processor buffers and their size.

Figure 8:
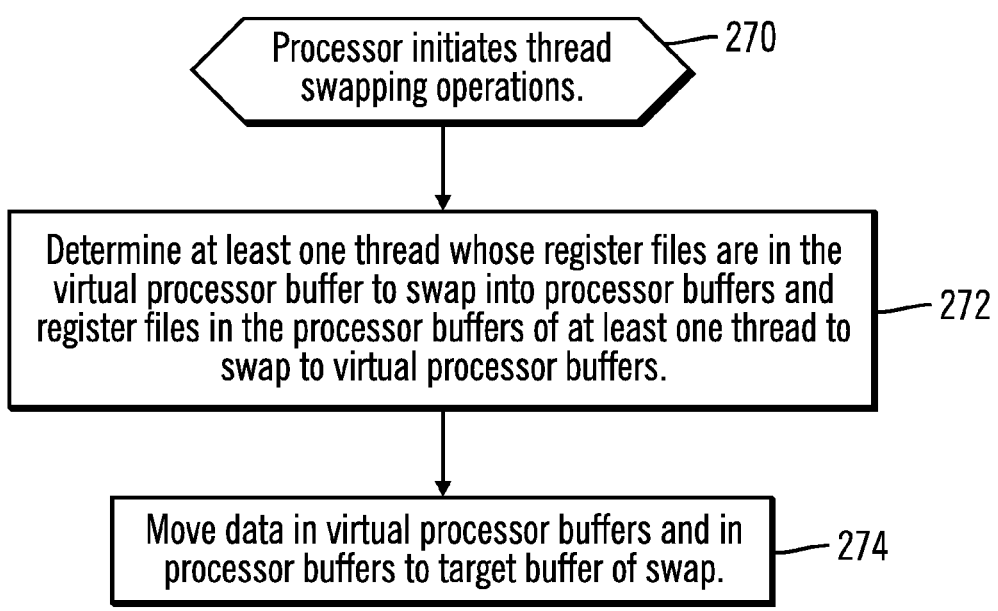
FIG. 8 illustrates an embodiment of operations for a processor to swap thread register files between virtual processor buffers and processor buffers.

FIG. 8 illustrates an embodiment of operations performed by the thread logic 12 to determine whether to swap register files 18 between virtual processor buffers in the main memory 6 and processor buffers 14 in the processor 8. Upon initiating (at block 270) thread swapping operations, the thread logic 12 determines (at block 272) at least one thread whose register files 18 are in one or more virtual processor buffers in the main memory 6 to swap into processor buffers 14 and register files 18 in the processor buffers 14 of at least one thread to swap to virtual processor buffers in the main memory 6. The thread logic 12 then exchanges (at block 274) data in virtual processor buffers and in processor buffers to a target buffer of the swap. In certain situations, the thread logic 12 may move threads from the processor buffers 14 to the virtual processor buffers in the main memory 6 without moving from virtual processor buffers to the processor buffers 14, and vice versa.

In certain embodiments, the thread logic 12 may move the register files 18 for threads that are less likely to be executed for a few microseconds, such as threads having no credits 54 or in the paused state from the processor buffers 14 to virtual processor buffers in the main memory 6. The processor 8 may maintain register files 18 for threads likely to be executed in the next few milliseconds in the processor buffers 14 to optimize execution of those threads soon-to-be executed. The processor 8 may move the register files for threads that are more likely to be executed soon, e.g., within the next few milliseconds, from the virtual processor buffers in the main memory 6 to the processor buffers 14.

Further, by using virtual processor buffers in the main memory 6, the processor is capable of increasing the number of threads that may be executed by the processor 8 by expanding the number of register files that may be maintained for threads, when previously the availability of processor buffers for register files would limit the number of threads that the processor 8 could handle. Yet further, the thread logic 12 may handle the swapping of threads between the processor buffers 14 and virtual processor buffers in the main memory 6 without any operating system intervention to increase the performance of such operations.

In certain embodiments, the processor 8 may not swap out all of the register file 18 information for a thread to swap. For instance, if the thread is blocked on a pause instruction, i.e., the pause status 58 is set, then the thread logic 12 may maintain the monitor information 12 for threads swapped to the virtual processor buffers in the processor buffers 8 so that when the event is detected, the processor may determine the thread to wake up. Further, for pause instructions, the processor 8 may limit the number of threads that may be paused to limit the amount of processor buffer 14 space used for monitor information 62. In one embodiment, the thread logic 12 may swap out a thread on which a pause instruction has been executed to a virtual processor buffer in main memory 6, but treat the thread as runnable, not paused if there is no further space in the processor buffers 14 available for thread monitor information 62.

Described embodiments provide techniques to enable a processor to alternate executing among threads based on available credits for the threads, without the processor having to return to the operating system in order to improve the performance of thread execution.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium including code executed by a processor to access buffers and perform operations, the operations comprising:
    setting credits in processor buffers for a plurality of threads executed by the processor, wherein the credits for a thread comprise a number of credits, wherein a thread having credits can be selected for execution and wherein a thread having no credits is not selected for execution;
    executing an operating system scheduler to configure the processor to execute the threads and set the thread credits;
    executing the operating system scheduler to allocate main memory addresses to the processor for the processor to use as virtual processor buffers to store status and the thread credits for designated threads, wherein the processor buffers for a first set of threads are maintained in the virtual processor buffers and the processor buffers for a second set of threads are maintained in the processor;
    determining threads whose status and credits are in the processor buffers to swap to virtual processor buffers and the status and credits of threads in the virtual processor buffer to swap to the processor buffers, wherein the threads to swap to the virtual processor buffers from the processor buffers have no credits or are in a paused state;
    alternating among executing the threads having available credits;
    decrementing the credits available for one of the threads to reduce the number of available credits for the thread in response to executing the thread;
    setting a replenish flag for a replenish thread to indicate that the replenish thread will not execute until all the other threads have no available credits; and
    initiating by the replenish thread an operation to reassign credits to the threads in response to the plurality of the threads other than the replenish thread having no available credits.

2. The article of manufacture of claim 1, wherein initiating the operation to reassign the credits comprises
    alternating among executing the threads having available credit in response to the replenish thread resetting the thread credits.

3. The article of manufacture of claim 2, wherein when the threads have available credits, the replenish thread does not execute until all the threads have no available credits, and wherein the operations further comprise:
    setting the replenish flag to indicate that the replenish thread is to execute to perform the operation to reassign the credits when all the threads have no available credits.

4. The article of manufacture of claim 1, wherein the operations further comprise:
    executing a pause instruction when executing one thread; and
    indicating the thread in which the pause instruction is executed as paused, wherein the processor does not execute the thread indicated as paused, and wherein the operation to reassign the credits is executed in response to all the threads assigned credits either having no available credits or being in the paused state.

5. The article of manufacture of claim 4, wherein the operations further comprise:
    initiating monitoring for an event in response to executing the pause instruction; and
    indicating the thread having the paused status as not paused in response to detecting the event during the monitoring, wherein the thread whose status is changed from paused to not paused is enabled to be executed by the processor if the thread has available credits.

6. The article of manufacture of claim 5, wherein the pause instruction indicates a memory location which the thread on which the pause instruction is executed needs to access, wherein the event comprises a change to the indicated memory location.

7. A system, comprising:
    a processor;
    a main memory;
    processor buffers included in the processor;
    an operating system scheduler executed by the processor to perform operations, the operations comprising:
        setting credits in the processor buffers for a plurality of threads executed by the processor wherein the credits for a thread comprise a number of credits, wherein a thread having credits can be selected for execution and wherein a thread having no credits is not selected for execution; and
        configuring the processor to execute the threads;
        allocating addresses in the main memory to the processor for the processor to use as virtual processor buffers to store status and the thread credits for designated threads, wherein the processor buffers for a first set of threads are maintained in the virtual processor buffers and the processor buffers for a second set of threads are maintained in the processor; and
    code executed by the processor to perform operations, the operations comprising:
        determining threads whose status and credits are in the processor buffers to swap to virtual processor buffers and the status and credits of threads in the virtual processor buffer to swap to the processor buffers, wherein the threads to swap to the virtual processor buffers from the processor buffers have no credits or are in a paused state;
        alternating among executing the threads having available credits;
        decrementing the credits available for one of the threads to reduce the number of available credits for the thread in response to executing the thread;
        setting a replenish flag for a replenish thread to indicate that the replenish thread will not execute until all the other threads have no available credits; and
        initiating by the replenish thread an operation to reassign credits to the threads in response to the plurality of the threads other than the replenish thread having no available credits.

8. The system of claim 7, wherein initiating the operation to reassign the credits comprises alternating among executing the threads having available credit in response to the replenish thread resetting the thread credits.

9. The system of claim 8, wherein when the threads have available credits, the replenish thread does not execute until all the threads have no available credits, wherein the code is further executed by the processor to perform operations comprising:
- setting the replenish flag to indicate that the replenish thread is to execute to perform the operation to reassign the credits when all the threads have no available credits.

10. The system of claim 7, wherein the code is further executed by the processor to perform operations comprising:
- executing a pause instruction when executing one thread; and
- indicating the thread in which the pause instruction is executed as paused, wherein the processor does not execute the thread indicated as paused, and wherein the operation to reassign the credits is executed in response to all the threads assigned credits either having no available credits or being in the paused state.

11. A method, comprising:
- setting credits for a plurality of threads in processor buffers executed by a processor, wherein the credits for a thread comprise a number of credits, wherein a thread having credits can be selected for execution and wherein a thread having no credits is not selected for execution;
- configuring, by an operating system scheduler, the processor to execute the threads and set the thread credits;
- allocating, by the operating system scheduler, main memory addresses to the processor for the processor to use as virtual processor buffers to store status and the thread credits for designated threads, wherein the processor buffers for a first set of threads are maintained in the virtual processor buffers and the processor buffers for a second set of threads are maintained in the processor;
- determining threads whose status and credits are in the processor buffers to swap to virtual processor buffers and the status and credits of threads in the virtual processor buffer to swap to the processor buffers, wherein the threads to swap to the virtual processor buffers from the processor buffers have no credits or are in a paused state;
- alternating, by the processor, among executing the threads having available credits;
- decrementing, by the processor, the credits available for one of the threads to reduce the number of available credits for the thread in response to executing the thread;
- setting, by the processor, a replenish flag for a replenish thread to indicate that the replenish thread will not execute until all the other threads have no available credits; and
- initiating an operation, by the processor, to execute a replenish thread to reassign credits to the threads in response to the plurality of the threads other than the replenish thread having no available credits.

12. The method of claim 11, wherein initiating the operation to reassign the credits comprises alternating, by the processor, among executing the threads having available credit in response to the replenish thread resetting the thread credits.

13. The method of claim 12, wherein when the threads have available credits, the replenish thread does not execute until all the threads have no available credits, further comprising:
- setting, by the processor, the replenish flag to indicate that the replenish thread is to execute to perform the operation to reassign the credits when all the threads have no available credits.

14. The method of claim 11, further comprising:
- executing, by the processor, a pause instruction when executing one thread; and
- indicating, by the processor, the thread in which the pause instruction is executed as paused, wherein the processor does not execute the thread indicated as paused, and wherein the operation to reassign the credits is executed in response to all the threads assigned credits either having no available credits or being in the paused state.

* * * * *